July 16, 1957 E. F. ANDREWS 2,799,353
JET DRIVEN HELICOPTER ROTOR SYSTEM
Original Filed Dec. 29, 1941
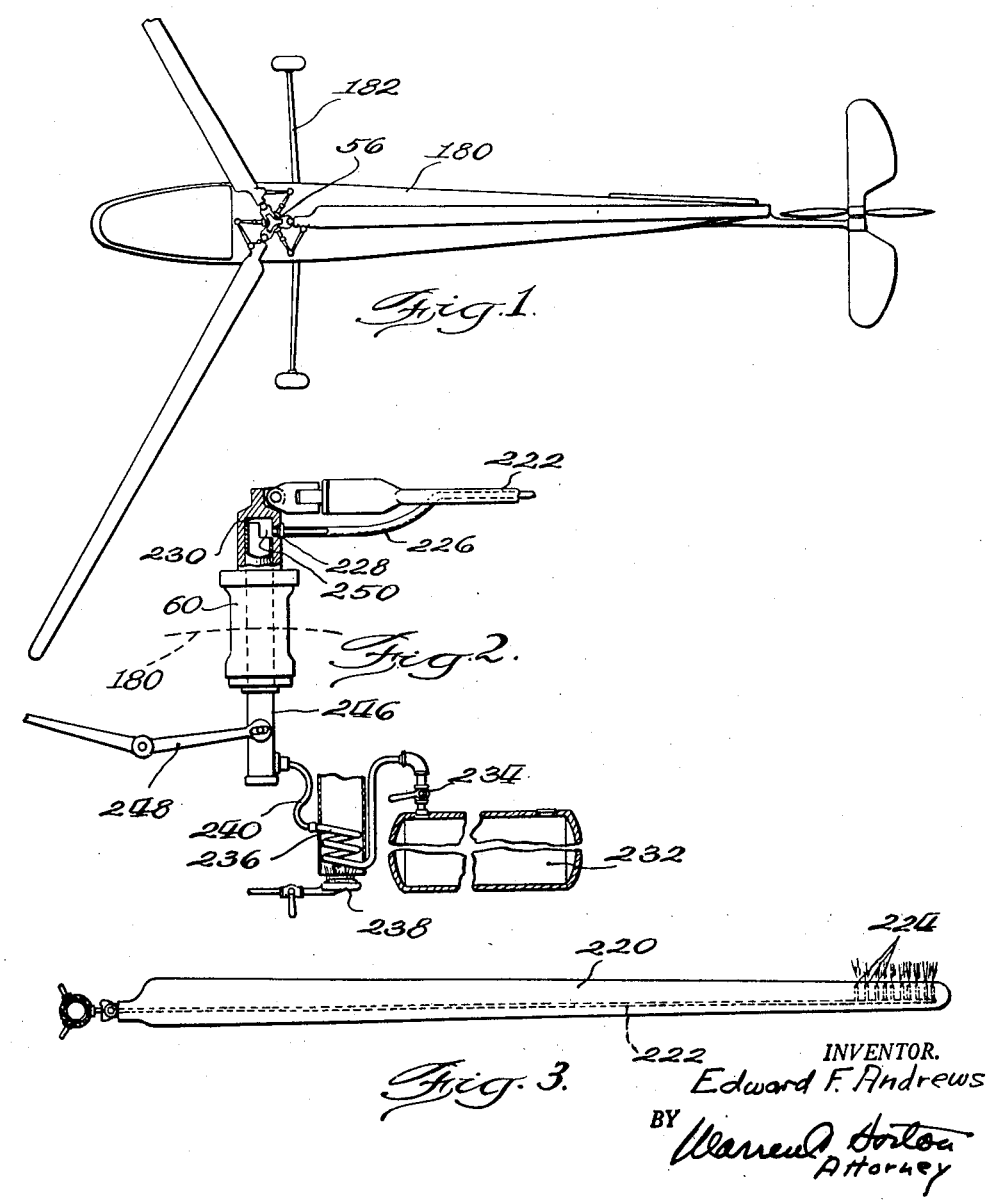
INVENTOR.
Edward F. Andrews
BY
Attorney

United States Patent Office 2,799,353
Patented July 16, 1957

2,799,353

JET DRIVEN HELICOPTER ROTOR SYSTEM

Edward F. Andrews, Belleair Beach, Largo, Fla.

Original application December 29, 1941, Serial No. 424,756, now Patent No. 2,511,687, dated June 13, 1950. Divided and this application May 18, 1953, Serial No. 355,817

8 Claims. (Cl. 170—135.4)

This application is a division of my application Serial No. 121,600 filed October 15, 1949 and of my application Serial No. 424,756 filed December 29, 1941 and issued June 13, 1950 as Patent No. 2,511,687.

This invention relates to aircraft and generally to rotating wing aircraft and improvements therein. This division is concerned with an invention for driving the rotating blades of a helicopter without producing torque reaction upon the aircraft fuselage, and more particularly relates to means for mounting a jet driven rotor and supplying it with propulsive fluid from the fuselage, and for controlling the flow of propulsive fluid with respect to the angular position of the rotor.

The invention of this application may be used in connection with rotating wing composite aircraft such as is described in my applications Ser. No. 121,600 filed October 15, 1949, Serial No. 424,756 filed December 29, 1941 and issued June 13, 1950 as Patent No. 2,511,687.

It will be understood that other embodiments and arrangements of this invention may be employed. For instance, the embodiment shown may be incorporated into a rotating wing unit and employed either as a component of a composite aircraft or by itself as a helicopter or autogyro.

It is an object of this invention to provide a simple, efficient jet reaction rotor drive for rotating wing aircraft for use during take-off only or for all phases of flight.

Another object of my invention is to provide an energy storage system for driving a rotor by jet reaction and, if desired, one suitable to the needs of a rotating wing composite aircraft as described in my copending application and issued patent above referred to.

A further object is to provide jet propulsion means for driving a rotating wing which can be caused to be effective only on the blades of a rotor which are moving forward relative to the direction of movement of the rotor as a whole in the general direction of the plane of rotation.

A further object is to provide a simple, efficient mounting and sealing means whereby a jet driven helicopter rotor is mounted on a fuselage and connected to a source of propulsive fluid in the fuselage.

A further object is to provide a jet reaction rotor drive in which the flow of propulsive fluid to the rotor jets can be generally controlled, and also controlled with respect to the angular position of the rotating rotor.

Other objects and advantages will become apparent from the accompanying drawing and the following description of a structure embodying features of my invention.

In the drawings, in which similar characters of reference refer to similar parts throughout the several views;

Fig. 1 is a plan view of an aircraft to which my invention may be applied, the figure being shown for illustration purposes as it is included in my copending application, Serial No. 121,600.

Fig. 2 is a diagrammatic representation of the central portion of a jet driven rotor showing an arrangement for mounting the rotor and supplying propulsive fluid thereto and for control thereof; and Fig. 3 is a somewhat diagrammatic plan view of one of the blades of the aircraft rotor shown in Fig. 1 and Fig. 2.

I prefer the continued supply of power from the power means to the rotating wing after the aircraft leaves the ground. This permits a continuous, generally vertical, or near-vertical, ascent and hovering flight, which facilitates take-off in the presence of high obstacles and facilitates control in restricted spaces with turbulent air. It also permits higher rotor loadings.

The rotating wing aircraft of this invention may be controlled in a manner similar to that more fully described in my copending application Serial No. 121,600.

The rotating wing aircraft of this invention contains its own power source which may be employed during take-off and which may also be employed during flight and landing. An autorotative landing may also be made.

In Fig. 1, I have shown a helicopter provided with a rotor which may be similar to that described in my copending application, Serial No. 121,600. Such figure is here included for the purpose of illustrating the application of the present invention to a helicopter which may or may not contain an additional power plant and which may or may not be equipped with a tail rotor for counter-torque or steering. The helicopter of Fig. 1 also may or may not be the rotating wing component of a rotating wing composite aircraft.

In Fig. 1, a rotating wing is designated as 56. The fuselage of the helicopter is designated as 180. The fuselage also carries a retractable landing gear 182.

In Figs. 2 and 3, I have shown an arrangement for driving the rotating blades of a helicopter without producing torque reaction upon the aircraft fuselage. With such an arrangement no torque compensating mechanism is necessary and thus the arrangement shown in Figs. 2 and 3, among other uses, is adapted for use with a rotating wing component of a composite aircraft of the type shown in my copending application, Serial No. 121,600, to provide additional power for take-off, return flight to the base, and to effect a landing thereat without requiring the complications that are inherent in a system of engine rotor drive.

As shown in Fig. 3, each of the blades indicated by the numeral 220 of the rotating wing has a heat insulated tube 222 extending longitudinally therethrough. Near the wing tip this tube is connected to one or more rearwardly directed jets 224. The inner end of each of these tubes is connected by means of flexible heat insulated tubing 226 to a fitting 228 extending through the side wall of a cylindrical chamber 230 that forms a portion of the rotor head. Thus steam or other gaseous medium fed to the chamber 230 will pass outwardly through the tubes 226 and 222 and will issue from the jets 224 in such a manner that the reaction from these jets will cause the leading edge of the rotating wing to advance.

A heat insulated tank 232 of superheated liquid is located within the aircraft and is connected by means of a valve 234 to a coil 236 so located that it can be heated by the flame from a burner 238, so that the steam issuing from the tank 232 is super-heated. This burner increases the energy and efficiency of the jet propulsion system and dry super-heated steam issues from the coil 236. The opposite end of this coil 236 is connected by means of a piece of flexible heat insulated tubing 240 to a heat insulated vertical hollow cylindrical member 246, the upper end of which fits within the chamber 230. This cylindrical member 246 is connected to a pivoted lever 248 under the control of an operator so that the operator can raise or lower the cylindrical member 246 by movement of this lever.

At its upper end, a considerable portion of one of the side walls of the cylindrical member 246 is removed, thereby providing an aperture or notch 250 in the tube wall opposite the inner ends of the fittings 228. The upper portion of the cylindrical member 246 therefore serves as a control valve which permits steam to enter a tube 226 when its rotating wing is in a position opposite the notch 250, while when the rotating wing is adjacent that portion of the cylindrical member which has not been notched, no steam can reach its tube 226.

The notch 250 of the cylindrical member 246 is so oriented that this notch is on the side of the aircraft upon which the rotating wing is advancing in the direction of forward flight. This arrangement provides a means for shutting off the flow of steam to the jets 224 excepting when the wing to which the jets are fitted is upon the side of the aircraft where the wing is traveling at the highest speed relative to the air stream. This is advantageous because jet propulsion is not efficient when the object to which the jet is attached is traveling at a low speed relative to the speed of the medium issuing from the nozzle, but jet propulsion increases greatly in efficiency when the velocity of the nozzle approaches the velocity of the jet. Therefore when the aircraft is moving forwardly, greater efficiency can be obtained if the steam is emitted from the jets only during the interval while the relative speed between a wing tip and the moving air stream is the greatest.

When it is desired to take off an aircraft equipped with a rotor and rotor propulsion mechanism of the type described, the burner 238 is ignited, the valve 234 is opened to permit the superheated liquid or steam to enter the coil 236, the lever 248 is shifted so as to move the cylindrical member 246 downwardly sufficiently to bring the upper end of the cylindrical member 246 below the fittings 228. Thus steam is admitted continuously to all of the rotor jets 224, thereby providing the maximum power for quick take-off. Once the aircraft is in the air and has attained the normal flying speed, the expenditure of power necessary to maintain it at this altitude is less than that necessary to cause it to rise. Since ordinarily when the aircraft is flown at any certain altitude it is also moving forwardly, the control lever 248 is shifted so as to move the cylindrical member 246 upwardly sufficiently to cut off steam from the jets 224 in each rotor wing as it moves rearwardly relative to the air stream.

The notched portion 250 shown in Fig. 2 can be differently shaped than is there shown if different characteristics are desired. For instance, the notched portion 250 may be V-shaped so that by progressively moving the cylindrical member 246 upwardly, the jets 224 could be made to idle through progressively greater portions of each revolution.

From the above description of my invention, it will be seen that this invention accomplishes all of the objectives set forth for it at an earlier portion in this specification.

What I claim as new and useful and desire to secure by Letters Patent of the United States is:

1. In an aircraft having a source of fluid pressure, a hub rotatably mounted on said aircraft, a blade carried by said hub, a fluid discharge orifice adjacent the tip of said blade for rotating said blade by the reaction of a rearward fluid discharge, a fluid conduit passing through said blade and connecting said orifice to said fluid pressure source, and valve mechanism for automatically controlling the flow of said fluid by the rotation of said hub and adapted to periodically interrupt the flow of fluid from said orifice when said blade is moving in a direction opposite to the forward movement of said aircraft, and for periodically reestablishing the flow of said fluid through said orifice when said blade is moving in the direction of the forward movement of said aircraft.

2. In a rotating wing aircraft adapted to forward movement, at least one lifting blade mounted for rotation thereon, jet propulsion means carried by said blade discharging a jet of fluid rearwardly to rotate said blade, and means associated with said blade for periodically interrupting the rearward discharge of fluid from said jet propulsion means when said blade is moving in a general direction opposite to the forward movement of said aircraft and for periodically re-establishing the propulsive discharge of said fluid from said jet propulsive means when said blade is moving in the general direction of the forward movement of the aircraft.

3. In an aircraft adapted to forward movement through the air having at least one rotatable lifting blade, a fluid discharge jet carried by said blade and located adjacent the tip of said blade for rotating said blade by the reaction of a rearward fluid discharge, means for discharging fluid continuously through said jet, and operable means for periodically interrupting the discharge of fluid through said jet when the rotary movement of said blade is in a general direction opposite to the forward movement of said aircraft and for periodically re-establishing the flow of fluid through said jet when the rotary movement of said blade is in the same general direction of the forward movement of said aircraft.

4. In an aircraft adapted for rapid horizontal movement having at least one lifting blade and a hub mounting said blade for rotation on said aircraft, a fluid discharge jet carried by said blade and located adjacent the tip of said blade for rotating said blade by the reaction of a rearward fluid discharge, fluid passage means in said blade establishing communication between said hub and said jet, stationary means on said aircraft mounting said hub for rotation, and means associated with said stationary means and said hub, and operating in synchronism with the relative rotation for automatically interrupting said jet discharge while the motion of said blade is opposite to the horizontal movement of said aircraft and for re-establishing said jet discharge while the movement of said blade is in the same general direction as the horizontal movement of said aircraft.

5. In a rotating wing aircraft, a body, a source of fluid under pressure carried by said body, a stationary sleeve member mounted on said body carrying bearing means, a hub member having a hollow interior rotatably mounted in said bearing means within said stationary sleeve member, a non-rotating hollow fluid transfer member extending into the hollow interior of said hub in close pressure sealing relation, a lifting blade carried by said hub, a fluid conduit within said blade, a fluid discharge orifice communicating with said conduit located adjacent the tip of said blade for rotating said blade by the reaction of a rearward fluid discharge, means connecting the interior of said hub with the fluid conduit in said blade, and fluid conducting means supplying fluid from said pressure source to the hollow interior of said fluid transfer member.

6. A rotating wing aircraft adapted for horizontal motion establishing a flight direction, a rotor on said aircraft having at least one blade, bearings on which the rotor turns, nozzle means on said blade from which a jet of fluid is projected rearwardly to turn the rotor on said bearings, a fluid passage within the blade communicating with the upstream end of said nozzle means, apparatus that supplies compressed fluid to said fluid passage, valve means upstream from the discharge end of said nozzle means and movable to interrupt the flow of compressed fluid through said nozzle means and automatic valve operating mechanism including elements responsive to the turning of the rotor on said bearings, said valve operating mechanism being constructed and arranged to interrupt the jet from said blade during the time that said blade is retreating relative to said flight direction.

7. A rotating wing aircraft adapted for horizontal motion establishing a flight direction, a rotor on said aircraft having at least one blade, bearings on which the rotor turns, nozzle means located at the end portion of said blade and from which at least one fluid jet is directed from the trailing edge of the blade, to turn the rotor on said bearings, a fluid passage within the blade communicating with the upstream end of said nozzle means, apparatus supplying compressed fluid to said fluid passage and automatic valve means upstream from the discharge end of said nozzle means for controlling the flow of compressed fluid through said nozzle, said valve means being correlated with a position of the bearings so as to close said valve means and prevent discharge of fluid from said nozzle means except when said blade is advancing in said flight direction.

8. A rotating wing aircraft, a pylon thereon carrying a hub, at least one blade extending from the hub, nozzle means at the outer end of said blade, a passage in said blade communicating with the nozzle means and with a fluid supply passage within the hub and through which compressed fluid from the hub flows to the nozzle means to produce a reaction jet that drives the rotor, valve means upstream from the discharge end of said nozzle means and mechanism for opening and closing said valve means in accordance with the angular position of the blade around said pylon whereby to improve the reaction jet drive of said rotor.

References Cited in the file of this patent

UNITED STATES PATENTS

| | | |
|---|---|---|
| 914,969 | Mueller | Mar. 9, 1909 |
| 1,344,661 | Strong | June 29, 1920 |
| 1,420,619 | Barton | June 27, 1922 |
| 1,545,214 | Sullivan | July 7, 1925 |
| 1,666,523 | Bailey | Apr. 7, 1928 |
| 1,932,702 | Langdon | Oct. 31, 1933 |
| 2,041,787 | Stalker | May 26, 1936 |
| 2,601,258 | Brzozowski | June 24, 1952 |